US010762862B2

(12) United States Patent
Chen (10) Patent No.: US 10,762,862 B2
(45) Date of Patent: Sep. 1, 2020

(54) DISPLAY PANEL AND DISPLAY APPARATUS

(71) Applicants: HKC Corporation Limited, Shenzhen (CN); Chongqing HKC Optoelectronics Technology Co., Ltd., Chongqing (CN)

(72) Inventor: Yu-Jen Chen, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 415 days.

(21) Appl. No.: 15/757,374

(22) PCT Filed: May 12, 2017

(86) PCT No.: PCT/CN2017/084058
§ 371 (c)(1),
(2) Date: Mar. 5, 2018

(87) PCT Pub. No.: WO2018/205239
PCT Pub. Date: Nov. 15, 2018

(65) Prior Publication Data
US 2020/0234666 A1 Jul. 23, 2020

(30) Foreign Application Priority Data

May 9, 2017 (CN) .................. 2017 1 03210630

(51) Int. Cl.
*G09G 3/36* (2006.01)
(52) U.S. Cl.
CPC ... *G09G 3/3648* (2013.01); *G09G 2300/0809* (2013.01); *G09G 2330/04* (2013.01)
(58) Field of Classification Search
None
See application file for complete search history.

(56) References Cited

U.S. PATENT DOCUMENTS

| 6,043,971 A | 3/2000 | Song et al. |
| 2007/0246778 A1 | 10/2007 | Liou et al. |
| 2014/0126093 A1* | 5/2014 | Duan ................ G02F 1/136204 361/56 |

FOREIGN PATENT DOCUMENTS

| CN | 102967973 A | 3/2013 |
| CN | 103294251 A | 9/2013 |

(Continued)

OTHER PUBLICATIONS

Weng Li the International Searching Authority written comments, Feb. 2018, CN.

*Primary Examiner* — Christopher J Kohlman (57) ABSTRACT

The present application discloses a display panel and a display apparatus. The display panel includes a substrate, an electrostatic discharge circuit disposed on the substrate and including a voltage gate high terminal (VGH terminal), a voltage gate low terminal (VGL terminal), an electrostatic input end and a common voltage terminal (VCOM terminal) coupled to components of the display panel, a first discharge unit and a second discharge unit, where the first discharge unit includes a first P-type thin film transistor and a second P-type thin film transistor, a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are also connected to the source of the first P-type thin film transistor, a source of the second P-type thin film transistor is connected to the VGL terminal, an input end of the second discharge unit is connected to the (Continued)

electrostatic input end, and an output end of the second discharge unit is connected to the VCOM terminal.

19 Claims, 9 Drawing Sheets

(56) References Cited

FOREIGN PATENT DOCUMENTS

| | | |
|---|---|---|
| CN | 103944154 A | 7/2014 |
| CN | 204667021 U | 9/2015 |
| CN | 105045008 A | 11/2015 |
| CN | 105637630 A | 6/2016 |
| JP | 2009003918 A | 1/2009 |

* cited by examiner

DISPLAY PANEL AND DISPLAY APPARATUS

TECHNICAL FIELD

The present application relates to the technical field of displays, and particularly relates to a display panel and a display apparatus.

BACKGROUND

Liquid crystal display apparatuses have numerous advantages, such as a thin body, power saving, no radiation, etc., and are widely used. Most liquid crystal display apparatuses in a current market are backlit liquid crystal display apparatuses, each including a liquid crystal panel and a backlight module. Working principle of the liquid crystal panel is that liquid crystals are put in two parallel glass substrates, and a driving voltage is applied to the two glass substrates to control rotational direction of the liquid crystals, to refract light rays of the backlight module to generate a picture.

Thin film transistor liquid crystal display apparatuses (TFT-LCD apparatuses) currently maintain a leading status in the display field because of low power consumption, excellent picture quality, high production yield, and other properties. Similarly, the TFT-LCD apparatus comprises a liquid crystal panel and a backlight module. The display panel comprises a color filter substrate (CF substrate), a thin film transistor substrate (TFT substrate), a mask and transparent electrodes on relative inner sides of the above substrates. A layer of liquid crystals (LC) is positioned between two substrates.

However, in a circuit of the display panel, components in the circuit are easy to be damaged by electrostatic discharge (ESD). Particularly when an ESD voltage appears on a picture element array, in an ESD protection circuit manufactured beside the picture element array, elements used in the circuit do not have low breakdown voltage or high conduction speed, and often cannot be conducted in time to discharge ESD current.

SUMMARY

A technical problem to be solved by the present application is to provide a display panel having a protection circuit for increasing electrostatic discharge (ESD) current.

In addition, the present application further provides a display apparatus.

A purpose of the present application is realized through a technical solution as follows.

A display panel comprises:

a substrate including a plurality of pixel regions, and an electrostatic discharge circuit disposed on the substrate, where the electrostatic discharge circuit comprises a voltage gate high terminal (VGH terminal) a voltage gate low terminal (VGL terminal), an electrostatic input end and a common voltage terminal (VCOM terminal) coupled to components of the display panel, and first discharge unit comprising a first P-type thin film transistor and a second P-type thin film transistor, where a gate of the first P-type thin film transistor is connected to a drain of the first P-type thin film transistor, and a gate and a drain of the first P-type thin film transistor are also connected with the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are also connected to the source of the first P-type thin film transistor, and a source of the second P-type thin film transistor is connected to the VGL terminal, and a second discharge unit, where an input end of the second discharge unit is connected to the electrostatic input end, and an output end of the second discharge unit is connected to the VCOM terminal.

The second discharge unit comprises a first conducting line with one end connected to the VCOM terminal. The VCOM terminal is connected to GND. A line thickness required for a conducting line used between the VGH terminal and the VGL terminal is small, which is equivalent to a large resistor station. A relative leakage current is also small. A capability of the first discharge unit alone to perform current leakage is insufficient. However, the second conducting line is used for connecting to GND. A line width of the second conducting line is greatly larger than line widths of VGH terminal and VGL terminal. Therefore, dischargeable current is greater than original current, to achieve a better protection.

The second discharge unit comprises a first conducting line with one end connected to the VCOM terminal. The VCOM terminal is connected to a VCOM terminal of the display panel. A line thickness required for a conducting line used between the VGH terminal and the VGL terminal) is small, which is equivalent to a large resistor station. A relative leakage current is also small. A capability of the first discharge unit alone to perform current leakage is insufficient. However, the second conducting line is used for connecting to a VCOM terminal. A line width of the second conducting line is greatly larger than line widths of VGH terminal and VGL terminal. Therefore, dischargeable current is greater than original current, achieving a better protection.

The second discharge circuit comprises a third thin film transistor. An input end and a control end of the third thin film transistor are connected to the electrostatic input end. An output end of the third thin film transistor is connected to the VCOM terminal. The second discharge unit leaks current through the third thin film transistor, which is simple, effective and reliable in arrangement.

The second discharge circuit comprises a capacitor. A first end of the capacitor is connected to the electrostatic input end. A second end of the capacitor is connected to the control end of the third thin film transistor. Through characteristics of direct current blocking, alternating current conducting, high frequency conducting and low frequency blocking of the capacitor, when a voltage range is within voltage gate low (VGL) to voltage gate high (VGH), the second discharge unit does not participate in the effect. Meanwhile, when the voltage range is not within VGL to VGH, for example, when a positive large voltage appears instantaneously, the second discharge unit can be properly operated without producing VGL current reserved by the second thin film transistor.

The second discharge circuit comprises a fourth thin film transistor. A control end of the fourth thin film transistor is connected to the VGL terminal. An output end of the fourth thin film transistor is connected to the VGH terminal. Conduction of the fourth thin film transistor further completes a discharge function of the second discharge unit. Meanwhile, a potential of the second end of the capacitor is pulled to be consistent with the VCOM terminal. Because of this, when the voltage range is within VGL to VGH, the third thin film transistor is not conducted to discharge to influence proper operation of the protection circuit.

The second discharge circuit comprises a third thin film transistor, a capacitor and a fourth thin film transistor. An input end and a control end of the third thin film transistor are connected to the electrostatic input end. An output end of the third thin film transistor is connected to the VCOM terminal. The VCOM terminal is connected to GND. A first end of the capacitor is connected to the electrostatic input end. A second end of the capacitor is connected to the control end of the third thin film transistor. An input end of a fourth thin film transistor is connected to the second end of the capacitor. A control end of the fourth thin film transistor is connected to the VGL terminal. An output end of the fourth thin film transistor is connected to the VGH terminal.

The third thin film transistor and the fourth thin film transistor are P-type thin film transistors: a third P-type thin film transistor and a fourth P-type thin film transistor. A source of the third P-type thin film transistor is connected to a gate of the second P-type thin film transistor. A drain of the third P-type thin film transistor is connected to the VCOM terminal. The VCOM terminal is connected to GND. A first end of the capacitor is connected to the electrostatic input end. A second end of the capacitor is connected to a gate of the third P-type thin film transistor. A source of the fourth P-type thin film transistor is connected to the second end of the capacitor. A gate of the fourth P-type thin film transistor is connected to the VGL terminal. A drain of the fourth P-type thin film transistor is connected to the VGH terminal. This is an embodiment of the protection circuit and defines specifically used electrical elements and connection relationships.

The display panel comprises a gate integrated circuit. The VGH terminal and the VGL terminal are respectively connected at a TFT voltage turn-on end and a TFT voltage turn-off end of the gate integrated circuit. This is specific connection of VGH terminal and VGL terminal.

According to another aspect of the present application, the present application further discloses a display apparatus. The display apparatus comprises a backlight module and the above display panel.

In the present application, since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life.

BRIEF DESCRIPTION OF DRAWINGS

The drawings included are used for providing further understanding of embodiments of the present application, constitute portion of the description, and are used to illustrate implementation manners of the present application, and interpret principles of the present application together with text description. Apparently, the drawings in the following description are merely some embodiments of the present application, and for those of ordinary skill in the art, other drawings can also be obtained according to the drawings without contributing creative labor. In the drawings.

DETAILED DESCRIPTION

Specific structure and function details disclosed herein are only representative and are used for the purpose of describing exemplary embodiments of the present application. However, the present application may be specifically achieved in many alternative forms and shall not be interpreted to be only limited to the embodiments described herein.

It should be understood in the description of the present application that terms such as "central", "horizontal", "upper", "lower", "left", "right", "vertical", "horizontal", "top", "bottom", "inner", "outer", etc. indicate direction or position relationships shown based on the drawings, and are only intended to facilitate the description of the present application and the simplification of the description rather than to indicate or imply that the indicated apparatus or element must have a specific direction or constructed and operated in a specific direction, and therefore, shall not be understood as a limitation to the present application. In addition, the terms such as "first" and "second" are only used for the purpose of description, rather than being understood to indicate or imply relative importance or hint the number of indicated technical features. Thus, the feature limited by "first" and "second" can explicitly or impliedly include one or more features. In the description of the present application, the meaning of "a plurality of" is two or more unless otherwise specified. In addition, the term "comprise" and any variant are intended to cover non-exclusive inclusion.

It should be noted in the description of the present application that, unless otherwise specifically regulated and defined, terms such as "installation," "connected," and "connection" shall be understood in broad sense, and for example, may refer to fixed connection or detachable connection or integral connection, may refer to mechanical connection or electrical connection, and may refer to direct connection or indirect connection through an intermediate medium or inner communication of two elements. For those of ordinary skill in the art, the meanings of the above terms in the present application may be understood according to concrete conditions.

The terms used herein are intended to merely describe specific embodiments, not to limit the exemplary embodiments. Unless otherwise noted clearly in the context, singular forms "one" and "single" used herein are also intended to comprise plurals. It should also be understood that the terms "comprise" and/or "include" used herein specify the existence of stated features, integers, steps, operation, units and/or assemblies, not excluding the existence or addition of one or more other features, integers, steps, operation, units, assemblies and/or combinations of these.

The present application will be further described in detail below in combination with the drawings and preferred embodiments.

Figure 1:
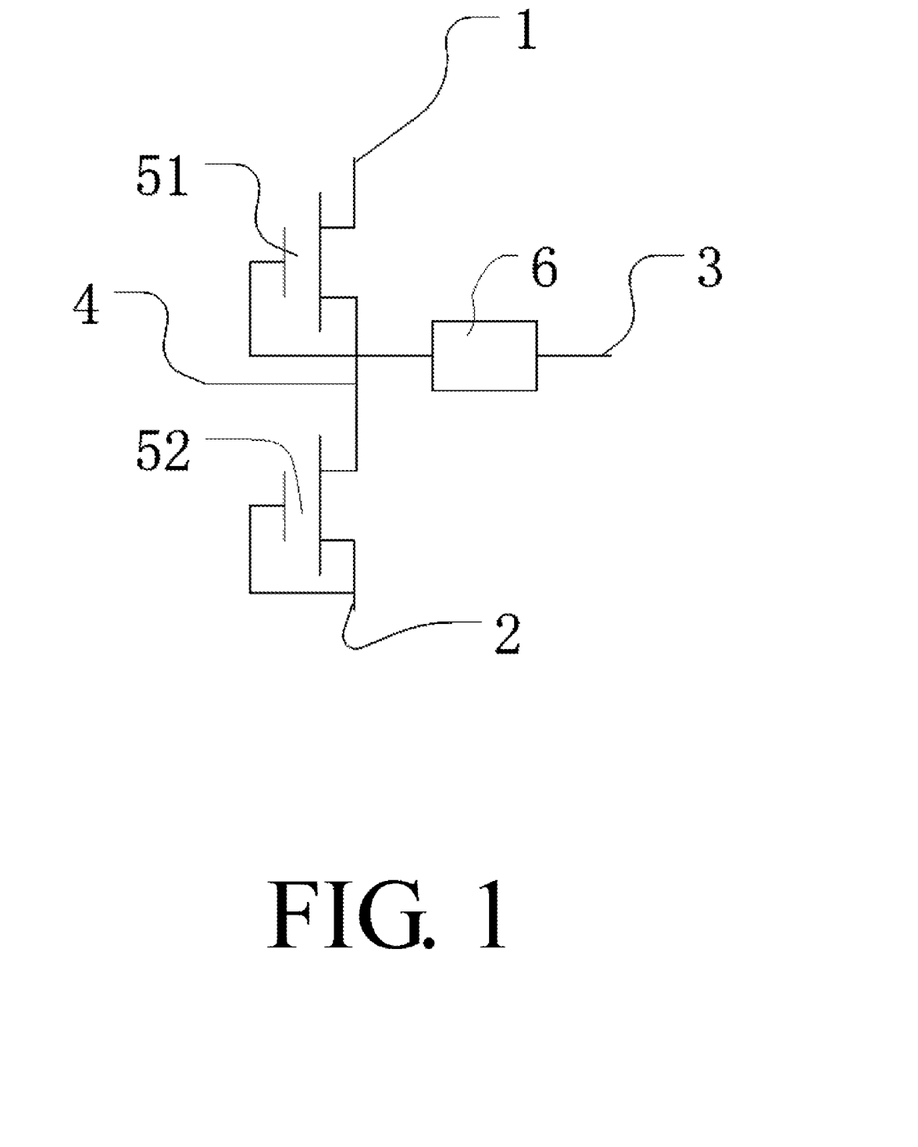
FIG. 1 is a schematic diagram of a protection circuit of a display panel in an embodiment of the present application.
Figure 2:
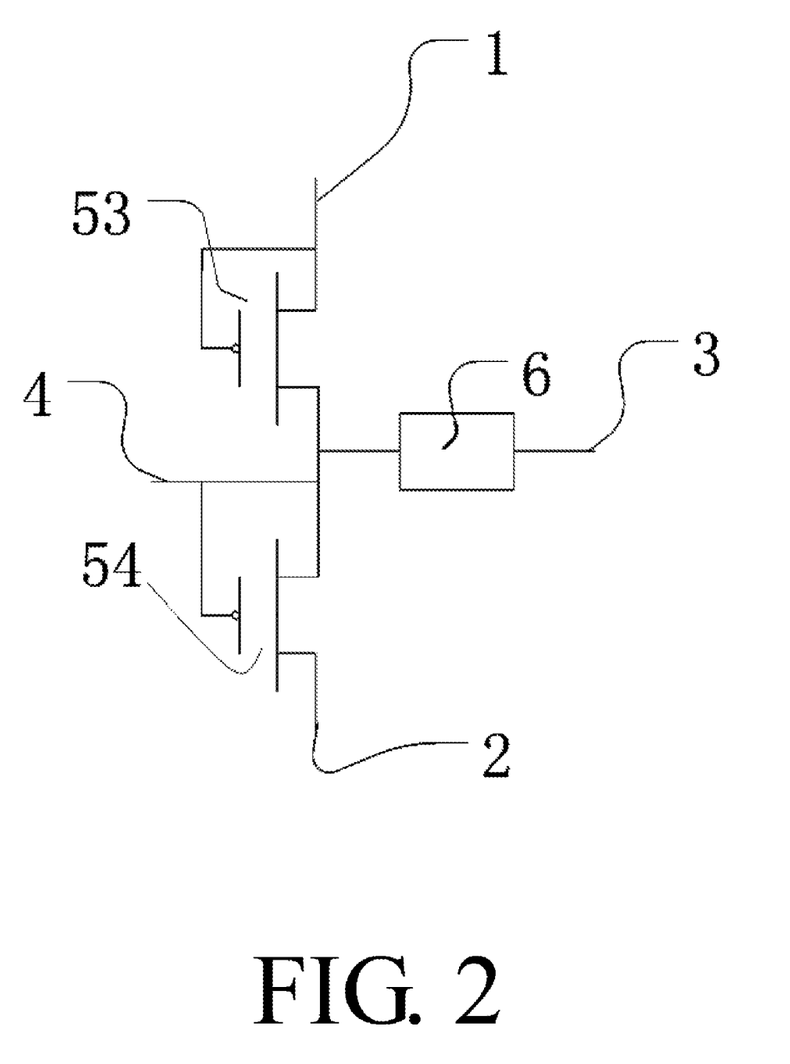
FIG. 2 is a schematic diagram of a protection circuit of a display panel in an embodiment of the present application.
Figure 9:
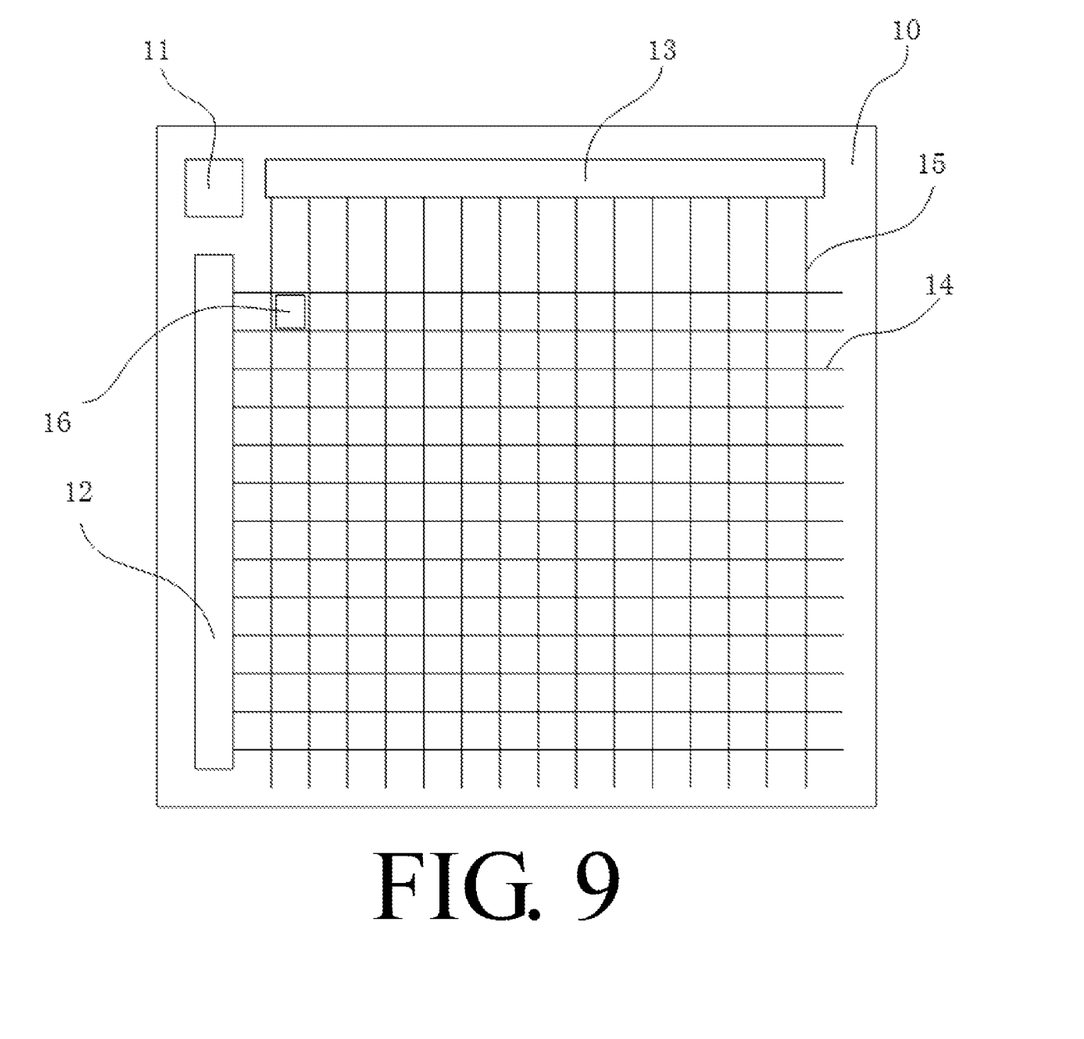
FIG. 9 is a structural schematic diagram of a display panel in an embodiment of the present application.

In an embodiment of the present application, as shown in FIGS. 1-2, the display panel comprises a substrate including a plurality of pixel regions, and an electrostatic discharge circuit disposed on the substrate and including a voltage gate high terminal (VGH terminal), a voltage gate low (VGL terminal), an electrostatic input end and a common voltage terminal (VCOM terminal) coupled to components of the display panel; and a first discharge unit, where an output end of the first discharge unit is respectively connected to the VGH terminal and the VGL terminal, and a control end and an input end of the first discharge unit are connected to the electrostatic input end; and a second discharge unit, where an input end of the second discharge unit is connected to the electrostatic input end, and an output end of the second discharge unit is connected to the VCOM terminal. The first discharge circuit comprises a first thin film transistor and a second thin film transistor. An output end of the first thin film transistor is connected to the VGH terminal. An input end of the first thin film transistor and an output end of the second thin film transistor are connected to the electrostatic input end. An input end of the second thin film transistor is connected to the VGL terminal. In the present application, since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life. As shown in FIG. 9, an ESD circuit, a gate driving circuit and a source driving circuit are disposed on the substrate, the horizontally disposed scanning lines and the vertically disposed data lines are coupled to corresponding circuits, and the plurality of data lines and the plurality of scanning lines are successively disposed to be intersected to form a plurality of pixel regions.

Specifically, the second discharge unit comprises a first conducting line with one end connected to the VCOM terminal, and the VCOM terminal is connected to GND. A line thickness required for a conducting line used between the VGH terminal and the VGL terminal is small, which is equivalent to a large resistor station. A relative leakage current is also small. A capability of the first discharge unit alone to perform current leakage is insufficient. However, the second conducting line is used for connecting to GND. A line width of the second conducting line is greatly larger than line widths of VGH terminal and VGL terminal. Therefore, dischargeable current is greater than original current, achieving a better protection. The second discharge unit comprises a first conducting line with one end connected to the VCOM terminal. The VCOM terminal is connected to VCOM terminal of the display panel. However, the second conducting line is used for connecting to a VCOM terminal. A line width of the second conducting line is greatly larger than line widths of VGH terminal and VGL terminal. Therefore, dischargeable current is greater than original current, achieving a better protection. The display panel comprises a gate integrated circuit. The VGH terminal and the VGL terminal are respectively connected at a TFT voltage turn-on end and a TFT voltage turn-off end of the gate integrated circuit.

In another embodiment of the present application, the display panel comprises a substrate including a plurality of pixel regions, and an electrostatic discharge circuit disposed on the substrate and including a VGH terminal, a VGL terminal, an electrostatic input end and a VCOM terminal coupled to components of the display panel; and a first discharge unit, where an output end of the first discharge unit is respectively connected to the VGH terminal and the VGL terminal, and a control end and an input end of the first discharge unit are connected to the electrostatic input end; and a second discharge unit, where an input end of the second discharge unit is connected to the electrostatic input end, and an output end of the second discharge unit is connected to the VCOM terminal. The first discharge circuit comprises a first thin film transistor and a second thin film transistor. An output end of the first thin film transistor is connected to the VGH terminal. An input end of the first thin film transistor and an output end of the second thin film transistor are connected to the electrostatic input end. An input end of the second thin film transistor is connected to the VGL terminal. Since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life. The second discharge circuit comprises a third thin film transistor, a capacitor and a fourth thin film transistor. An input end and a control end of the third thin film transistor are connected to the electrostatic input end. An output end of the third thin film transistor is connected to the VCOM terminal. The second discharge unit leaks current through the third thin film transistor, which is simple, effective and reliable in arrangement. A first end of the capacitor is connected to the electrostatic input end. A second end of the capacitor is connected to the control end of the third thin film transistor. Through characteristics of direct current blocking, alternating current conducting, high frequency conducting and low frequency blocking of the capacitor, when a voltage range is within VGL to VGH, the second discharge unit does not participate in the effect. Meanwhile, when the voltage range is not within VGL to VGH, for example, when a positive large voltage appears instantaneously, the second discharge unit can be properly operated without producing VGL current reserved by the second thin film transistor. Therefore, if an input voltage range of PIN (PIN as the pin of the electrostatic input end) is within VGL to VGH, because a capacitor can be regarded as an open circuit in direct current, the capacitor and the thin film transistors do not act.

Figure 3:
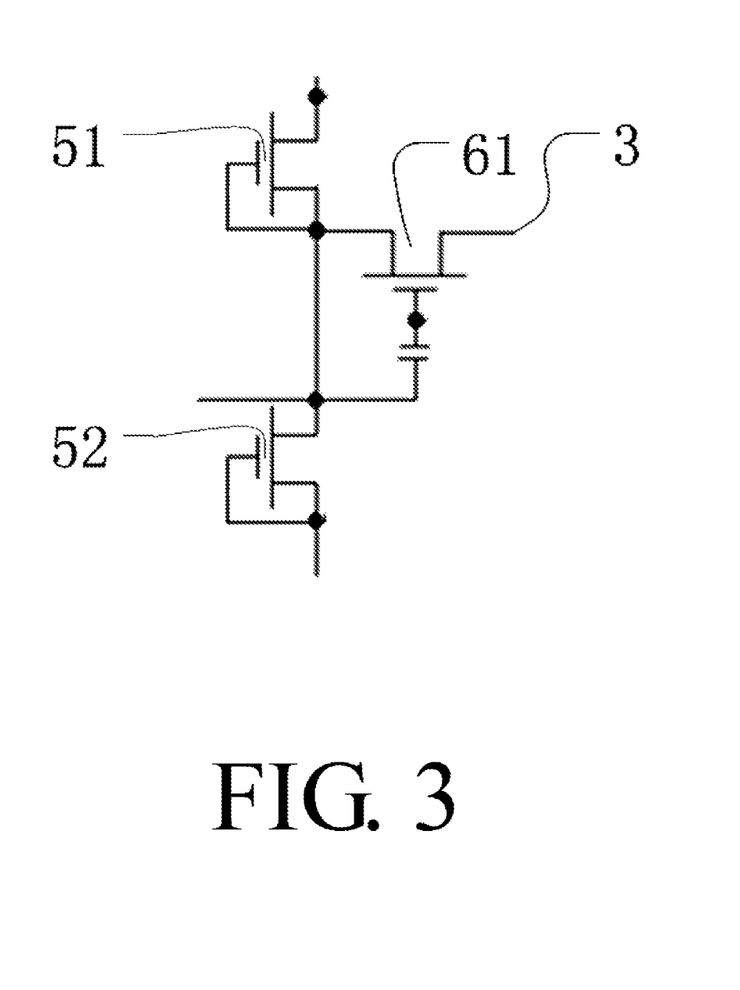
FIG. 3 is a schematic diagram of a protection circuit of a display panel in an embodiment of the present application.

Specifically, as shown in FIG. 3, the first thin film transistor and the second thin film transistor are N-type thin film transistors: a first N-type thin film transistor and a second N-type thin film transistor. A source of the first N-type thin film transistor is connected to the VGH terminal. A gate of the first N-type thin film transistor is connected to a drain of the first N-type thin film transistor, and a gate and a drain of the first N-type thin film transistor are also connected to the source of the second N-type thin film transistor. A source of the second N-type thin film transistor is connected to the electrostatic input end. A gate of the second N-type thin film transistor is connected to a drain of the second N-type thin film transistor, and a gate and a drain of the second N-type thin film transistor are also connected to the VGL terminal. A source of the third N-type thin film transistor is connected to a gate of the first N-type thin film transistor. A drain of the third N-type thin film transistor is connected to the VCOM terminal. The VCOM terminal is connected to GND. A first end of the capacitor is connected to the electrostatic input end. A second end of the capacitor is connected to a gate of the third N-type thin film transistor.

When a positive large voltage instantaneously comes in the PIN, the first N-type thin film transistor is conducted and first discharge current is generated. Since the potential of the PIN is increased instantaneously and a potential of a connection point between the second end of the capacitor and the gate of the third N-type thin film transistor is simultaneously increased under a special efficacy of capacitive coupling, the third N-type thin film transistor is also conducted. At this moment, the positive large voltage of the PIN can leak current to GND. Since wiring of GND is usually thicker than wiring of VGL terminal, a corresponding resistance value is greatly smaller than a resistance value of VGL terminal and the second discharge current is greater than the first discharge current.

Of course, the first discharge unit can use a P-type thin film transistor, or use the N-type thin film transistor and the P-type thin film transistor together. For example, the first thin film transistor and the second thin film transistor are P-type thin film transistors: a first P-type thin film transistor and a second P-type thin film transistor. A gate of the first P-type thin film transistor is connected to a drain of the first P-type thin film transistor, and a gate and a drain of the first P-type thin film transistor are also connected to the VGH terminal. A source of the first P-type thin film transistor is connected to the electrostatic input end. A gate of the second P-type thin film transistor is connected to a drain of the second P-type thin film transistor, and a gate and a drain of the second P-type thin film transistor are also connected to the source of the first P-type thin film transistor. A source of the second P-type thin film transistor is connected to the VGL terminal.

In another embodiment of the present application, the display panel comprises a substrate including a plurality of pixel regions, and an electrostatic discharge circuit disposed on the substrate and including a VGH terminal, a VGL terminal, an electrostatic input end and a VCOM terminal coupled to components of the display panel; and a first discharge unit, where an output end of the first discharge unit is respectively connected to the VGH terminal and the VGL terminal, and a control end and an input end of the first discharge unit are connected to the electrostatic input end; and a second discharge unit, where an input end of the second discharge unit is connected to the electrostatic input end, and an output end of the second discharge unit is connected to the VCOM terminal. The first discharge circuit comprises a first thin film transistor and a second thin film transistor. An output end of the first thin film transistor is connected to the VGH terminal. An input end of the first thin film transistor and an output end of the second thin film transistor are connected to the electrostatic input end. An input end of the second thin film transistor is connected to the VGL terminal. Since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life. The second discharge circuit comprises a third thin film transistor, a capacitor and a fourth thin film transistor. An input end and a control end of the third thin film transistor are connected to the electrostatic input end. An output end of the third thin film transistor is connected to the VCOM terminal. The second discharge unit leaks current through the third thin film transistor, which is simple, effective and reliable in arrangement. A first end of the capacitor is connected to the electrostatic input end. A second end of the capacitor is connected to the control end of the third thin film transistor. Through characteristics of direct current blocking, alternating current conducting, high frequency conducting and low frequency blocking of the capacitor, when a voltage range is within VGL to VGH, the second discharge unit does not participate in the effect. Meanwhile, when the voltage range is not within VGL to VGH, for example, when a positive large voltage appears instantaneously, the second discharge unit can be properly operated without producing VGL current reserved by the second thin film transistor. Therefore, if an input voltage range of PIN is within VGL to VGH, because a capacitor can be regarded as an open circuit in direct current, the capacitors and the thin film transistors do not act. An input end of a fourth thin film transistor is connected to the second end of the capacitor. A control end of the fourth thin film transistor is connected to the VGH terminal. An output end of the fourth thin film transistor is connected to the VGL terminal. Or, a control end of the fourth thin film transistor is connected to the VGL terminal. An output end of the fourth thin film transistor is connected to the VGH terminal. Conduction of the fourth thin film transistor further completes a discharge function of the second discharge unit. Meanwhile, a potential of the second end of the capacitor is pulled to be consistent with the VCOM terminal. Because of this, when the voltage range is within VGL to VGH, the third thin film transistor is not conducted to discharge to influence proper operation of the protection circuit.

Figure 4:
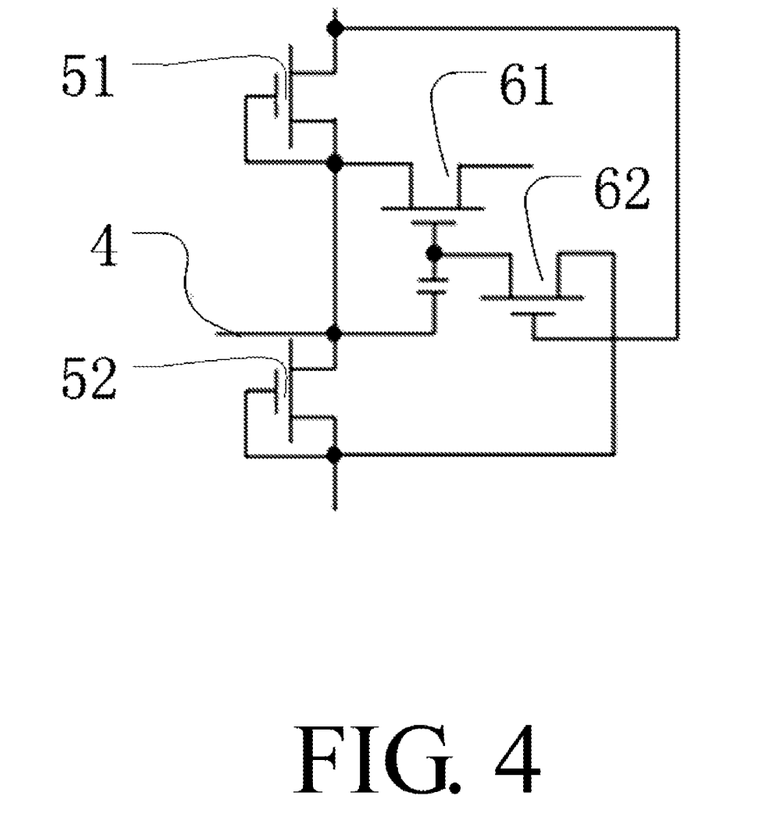
FIG. 4 is a schematic diagram of a protection circuit of a display panel in an embodiment of the present application.
Figure 5:
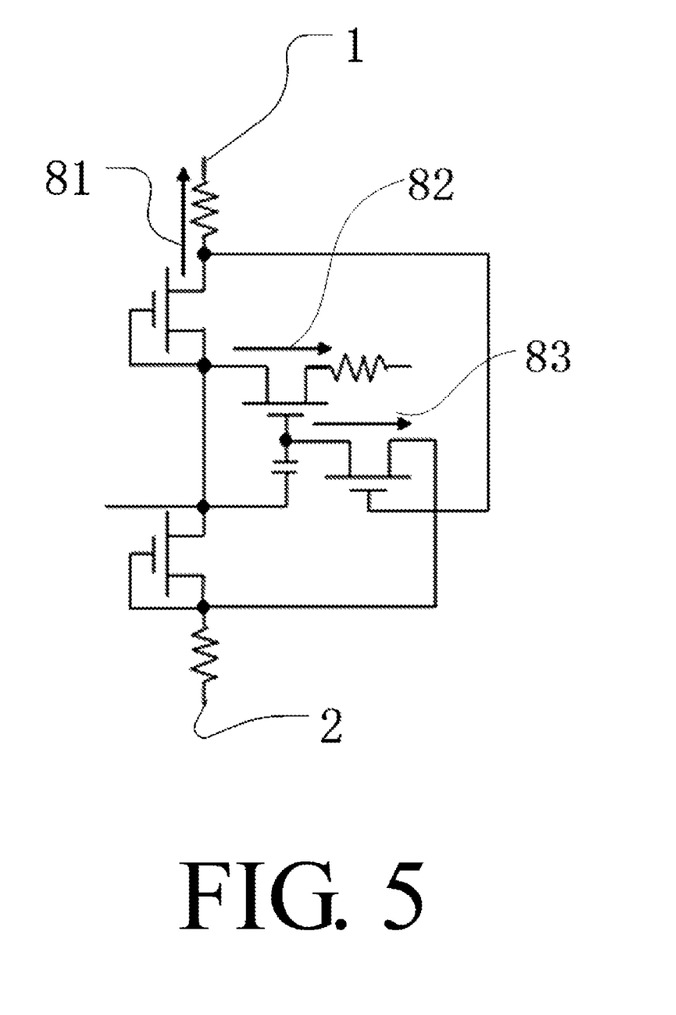
FIG. 5 is a schematic diagram of a protection circuit of a display panel in an embodiment of the present application.

Specifically, as shown in FIGS. 4-5, FIG. 5 can be regarded as an actual equivalent circuit of FIG. 4. The first thin film transistor and the second thin film transistor are N-type thin film transistors: a first N-type thin film transistor and a second N-type thin film transistor. A source of the first N-type thin film transistor is connected to the VGH terminal. A gate of the first N-type thin film transistor is connected to a drain of the first N-type thin film transistor, and a gate and a drain of the first N-type thin film transistor are also connected to the source of the second N-type thin film transistor. A source of the second N-type thin film transistor is connected to the electrostatic input end. A gate of the second N-type thin film transistor is connected to a drain of the second N-type thin film transistor, and a gate and a drain of the second N-type thin film transistor are also connected to the VGL terminal. The second discharge circuit comprises a third N-type thin film transistor, a capacitor and a fourth N-type thin film transistor. A source of the third N-type thin film transistor is connected to a gate of the first N-type thin film transistor. A drain of the third N-type thin film transistor is connected to the VCOM terminal. The VCOM terminal is connected to GND. A first end of the capacitor is connected to the electrostatic input end. A second end of the capacitor is connected to a gate of the third N-type thin film transistor. A source of the fourth N-type thin film transistor is connected to the second end of the capacitor. A gate of the fourth N-type thin film transistor is connected to the VGH terminal. A drain of the fourth N-type thin film transistor is connected to the VGL terminal. This is an embodiment of the protection circuit and defines specifically used electrical elements and connection relationships. Since the potential of the PIN is increased instantaneously and a potential of a connection point between the second end of the capacitor and the gate of the third N-type thin film transistor is simultaneously increased under a special efficacy of capacitive coupling, the third N-type thin film transistor is also conducted. At this moment, the positive large voltage of the PIN can leak current to GND. Since wiring of GND is usually thicker than wiring of VGL terminal, a corresponding resistance value is greatly smaller than a resistance value of VGL terminal and the second discharge current is greater than the first discharge current. However, the fourth N-type thin film transistor also simultaneously pulls the potential of a connection point between the second end of the capacitor and the gate of the third N-type thin film transistor to GND. Therefore, when a positive large voltage instantaneously comes in the PIN, the leaked current is a sum of the first discharge current, the second discharge current and the third discharge current. Compared with an individual action of the first discharge unit, a total leakage current is larger and a better protection is realized.

Of course, the first discharge unit can use a P-type thin film transistor, or use the N-type thin film transistor and the P-type thin film transistor together. For example, the first thin film transistor and the second thin film transistor are P-type thin film transistors: a first P-type thin film transistor and a second P-type thin film transistor. A gate of the first P-type thin film transistor is connected to a drain of the first P-type thin film transistor, and a gate and a drain of the first P-type thin film transistor are also connected to the VGH terminal. A source of the first P-type thin film transistor is connected to the electrostatic input end. A gate of the second P-type thin film transistor is connected to a drain of the second P-type thin film transistor, and a gate and a drain of the second P-type thin film transistor are also connected to the source of the first P-type thin film transistor. A source of the second P-type thin film transistor is connected to the VGL terminal.

In another embodiment of the present application, as shown in FIG. 2, the display panel comprises: a substrate including a plurality of pixel regions, and an electrostatic discharge circuit disposed on the substrate and including a VGH terminal, a VGL terminal, an electrostatic input end and a VCOM terminal coupled to components of the display panel; and a first discharge unit, where the first discharge unit comprises a first P-type thin film transistor and a second P-type thin film transistor, a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are also connected to the source of the first P-type thin film transistor, and a source of the second P-type thin film transistor is connected to the VGL terminal; and a second discharge unit, where an input end of the second discharge unit is connected to the electrostatic input end, and an output end of the second discharge unit is connected to the VCOM terminal. In the present application, since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life.

Specifically, the second discharge unit comprises a first conducting line with one end connected to the VCOM terminal. The VCOM terminal is connected to GND. A line thickness required for a conducting line used between the VGH terminal and the VGL terminal is small, which is equivalent to a large resistor station. A relative leakage current is also small. A capability of the first discharge unit alone to perform current leakage is insufficient. However, the second conducting line is used for connecting to GND. A line width of the second conducting line is greatly larger than line widths of VGH terminal and VGL terminal. Therefore, dischargeable current is greater than original current, achieving a better protection. The second discharge unit comprises a first conducting line with one end connected to the VCOM terminal. The VCOM terminal is connected to a VCOM terminal of the display panel. However, the second conducting line is used for connecting to VCOM terminal. A line width of the second conducting line is greatly larger than line widths of VGH terminal and VGL terminal. Therefore, dischargeable current is greater than original current to achieve a better protection. The display panel comprises a gate integrated circuit. The VGH terminal and the VGL terminal are respectively connected at a TFT voltage turn-on end and a TFT voltage turn-off end of the gate integrated circuit.

In another embodiment of the present application, the display panel comprises a substrate including a plurality of pixel regions, and an electrostatic discharge circuit disposed on the substrate and including a VGH terminal, a VGL terminal, an electrostatic input end and a VCOM terminal coupled to components of the display panel; and a first discharge unit, where the first discharge unit comprises a first P-type thin film transistor and a second P-type thin film transistor, a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are also connected to the source of the first P-type thin film transistor, and a source of the second P-type thin film transistor is connected to the VGL terminal; and a second discharge unit, where an input end of the second discharge unit is connected to the electrostatic input end, and an output end of the second discharge unit is connected to the VCOM terminal. Since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life. The second discharge circuit comprises a third thin film transistor and a capacitor. An input end and a control end of the third thin film transistor are connected to the electrostatic input end. An output end of the third thin film transistor is connected to the VCOM terminal. The second discharge unit leaks current through the third thin film transistor, which is simple, effective and reliable in arrangement. The second discharge circuit comprises: A first end of the capacitor is connected to the electrostatic input end, and a second end of the capacitor is connected to the control end of the third thin film transistor. Through characteristics of direct current blocking, alternating current conducting, high frequency conducting and low frequency blocking of the capacitor, when a voltage range is within VGL to VGH, the second discharge unit does not participate in the effect. Meanwhile, when the voltage range is not within VGL to VGH, for example, when a positive large voltage appears instantaneously, the second discharge unit can be properly operated without producing VGL current reserved by the second thin film transistor. Therefore, if an input voltage range of PIN is within VGL to VGH, because a capacitor can be regarded as an open circuit in direct current, the capacitor and the thin film transistors do not act.

Figure 6:
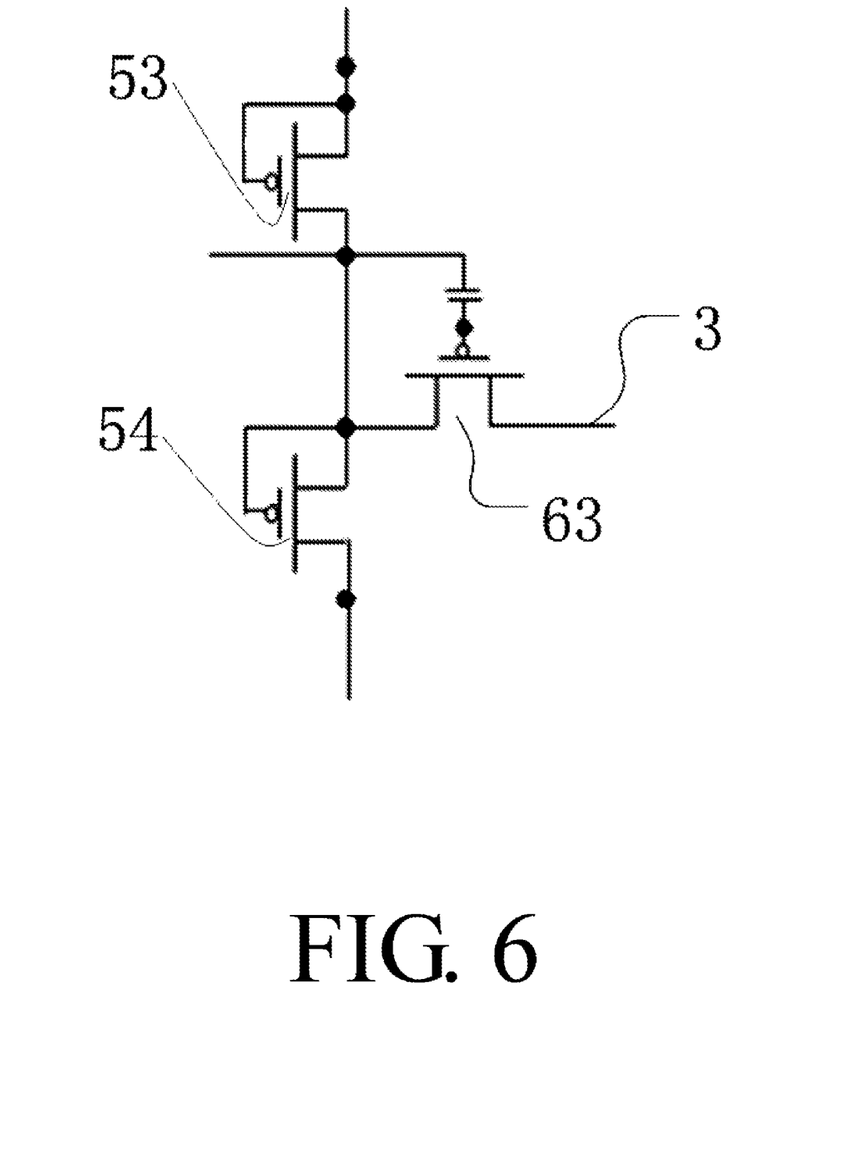
FIG. 6 is a schematic diagram of a protection circuit of a display panel in an embodiment of the present application.

Specifically, as shown in FIG. 6, the third thin film transistor is a P-type thin film transistor: a third P-type thin film transistor. A source of the third P-type thin film transistor is connected to a gate of the second P-type thin film transistor. A drain of the third P-type thin film transistor is connected to the VCOM terminal. The VCOM terminal is connected to GND. A first end of the capacitor is connected to the electrostatic input end. A second end of the capacitor is connected to a gate of the third P-type thin film transistor. Since the potential of the PIN is increased instantaneously and a potential of a connection point between the second end of the capacitor and the gate of the third N-type thin film transistor is simultaneously increased under a special efficacy of capacitive coupling, the third N-type thin film transistor is also conducted. At this moment, the positive large voltage of the PIN can leak current to GND. Since wiring of GND is usually thicker than wiring of VGL, a corresponding resistance value is greatly smaller than a resistance value of VGL and the second discharge current is greater than the first discharge current.

In another embodiment of the present application, the display panel comprises: a substrate including a plurality of pixel regions, and an electrostatic discharge circuit disposed on the substrate and including a VGH terminal, a VGL terminal, an electrostatic input end and a VCOM terminal coupled to components of the display panel; and a first discharge unit, where the first discharge unit comprises a first P-type thin film transistor and a second P-type thin film transistor, a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, connected and a gate and a drain of the second P-type thin film transistor are also connected to the source of the first P-type thin film transistor, and a source of the second P-type thin film transistor is connected to the VGL terminal; and a second discharge unit, where an input end of the second discharge unit is connected to the electrostatic input end, and an output end of the second discharge unit is connected to the VCOM terminal. Since the connected first discharge unit and second discharge unit act jointly and the other end of the second discharge unit is connected to the VCOM terminal, an ESD current path is increased, and speed and number of leakage current are increased, thereby realizing a better protection for the display panel and prolonging service life. The second discharge circuit comprises a third thin film transistor, a capacitor and a fourth thin film transistor. An input end and a control end of the third thin film transistor are connected to the electrostatic input end. An output end of the third thin film transistor is connected to the VCOM terminal. The second discharge unit leaks current through the third thin film transistor, which is simple, effective and reliable in arrangement. The second discharge circuit comprises: A first end of the capacitor is connected to the electrostatic input end, and a second end of the capacitor is connected to the control end of the third thin film transistor. Through characteristics of direct current blocking, alternating current conducting, high frequency conducting and low frequency blocking of the capacitor, when a voltage range is within VGL to VGH, the second discharge unit does not participate in the effect. Meanwhile, when the voltage range is not within VGL to VGH, for example, when a positive large voltage appears instantaneously, the second discharge unit can be properly operated without producing VGL current reserved by the second thin film transistor. Therefore, if an input voltage range of PIN is within voltage gate low (VGL) to voltage gate high (VGH), because a capacitor can be regarded as an open circuit in direct current, the capacitor and the thin film transistor do not act. A control end of the fourth thin film transistor is connected to the VGL terminal. An output end of the fourth thin film transistor is connected to the VGH terminal. Conduction of the fourth thin film transistor further completes a discharge function of the second discharge unit. Meanwhile, a potential of the second end of the capacitor is pulled to be consistent with the VCOM terminal. Because of this, when the voltage range is within VGL to VGH, the third thin film transistor is not conducted to discharge to influence proper operation of the protection circuit.

Figure 7:
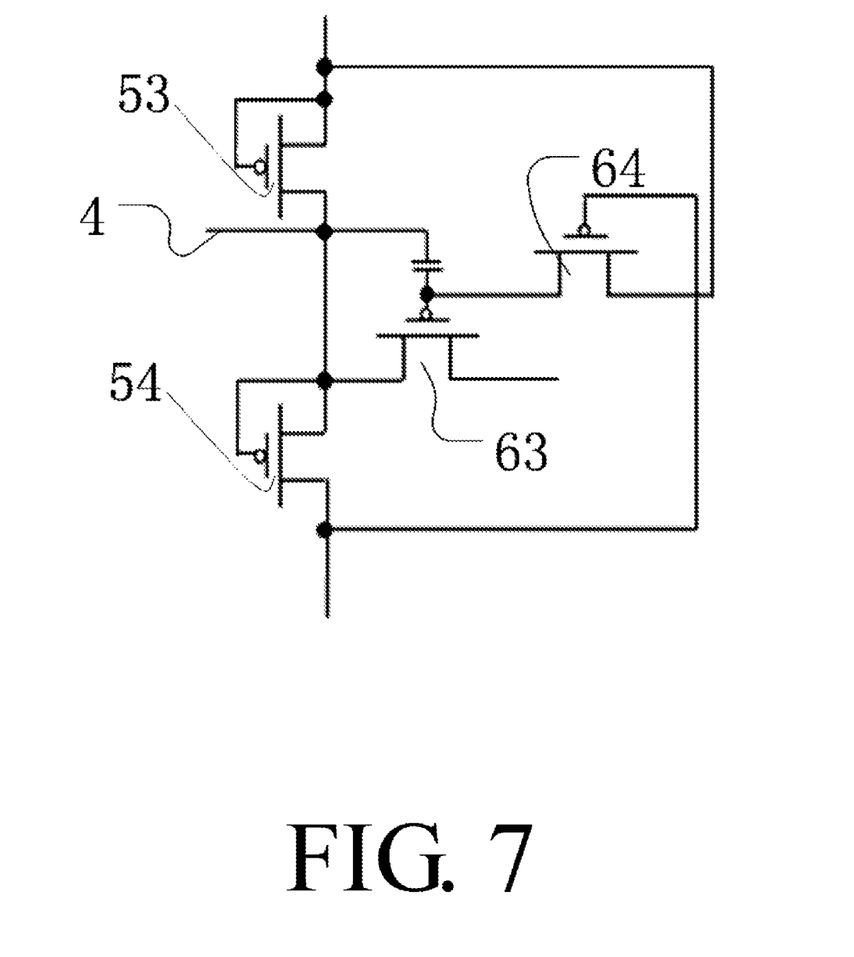
FIG. 7 is a schematic diagram of a protection circuit of a display panel in an embodiment of the present application.
Figure 8:
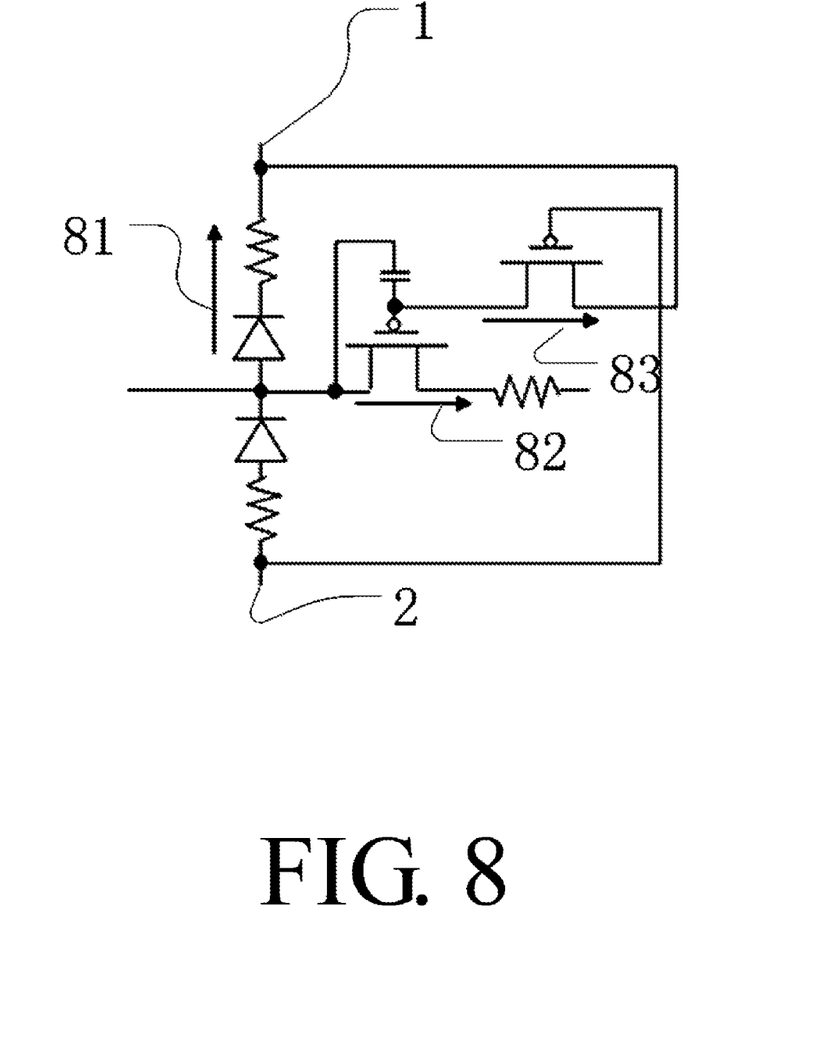
FIG. 8 is a schematic diagram of a protection circuit of a display panel in an embodiment of the present application.

Specifically, as shown in FIGS. 7-8, FIG. 8 can be regarded as an actual equivalent circuit of FIG. 7. The third thin film transistor and the fourth thin film transistor are P-type thin film transistors: a third P-type thin film transistor and a fourth P-type thin film transistor. A source of the third P-type thin film transistor is connected to a gate of the second P-type thin film transistor. A drain of the third P-type thin film transistor is connected to the VCOM terminal. The VCOM terminal is connected to GND. A first end of the capacitor is connected to the electrostatic input end. A second end of the capacitor is connected to a gate of the third P-type thin film transistor. A source of the fourth P-type thin film transistor is connected to the second end of the capacitor. A gate of the fourth P-type thin film transistor is connected to the VGL terminal. A drain of the fourth P-type thin film transistor is connected to the VGH terminal. Since the potential of the PIN is increased instantaneously and a potential of a connection point between the second end of the capacitor and the gate of the third N-type thin film transistor is simultaneously increased under a special efficacy of capacitive coupling, the third N-type thin film transistor is also conducted. At this moment, the positive large voltage of the PIN can leak current to GND. Since wiring of GND is usually thicker than wiring of VGL, a corresponding resistance value is greatly smaller than a resistance value of VGL and the second discharge current is greater than the first discharge current. However, the fourth N-type thin film transistor also simultaneously pulls the potential of a connection point between the second end of the capacitor and the gate of the third N-type thin film transistor to GND. Therefore, when a positive large voltage instantaneously comes in the PIN, the leaked current is a sum of the first discharge current, the second discharge current and the third discharge current. Compared with an individual action of the first discharge unit, a total leakage current is larger and a better protection is realized.

In another embodiment of the present application, the present application further discloses a display apparatus comprising a backlight module and the above display panel.

It should be noted that the substrate can be made of glass, plastics, etc. in the above embodiment.

In the above embodiment, the display panel comprises a liquid crystal panel, an organic light-emitting diode (OLED) panel, a curved surface type panel, a plasma panel and the like. By taking the liquid crystal panel as an example, the liquid crystal panel comprises a thin film transistor substrate (TFT Substrate) and a color filter substrate (CF Substrate). The TFT substrate and the CF substrate are disposed opposite to each other. Liquid crystals and photo spacers (PS) are disposed between the TFT substrate and the CF substrate. A thin film transistor (TFT) is disposed on the TFT substrate. A color filter layer is disposed on the CF substrate.

In the above embodiment, the CF substrate may comprise a TFT array. A color filter and the TFT array may be formed on the same substrate. The TFT substrate may comprise the color filter layer.

In the above embodiment, the display panel of the present application may be a curved surface type panel.

The above contents are further detailed descriptions of the present application in combination with specific preferred embodiments. However, the specific implementation of the present application shall not be considered to be only limited to these descriptions. For those of ordinary skill in the art to which the present application belongs, several simple deductions or replacements may be made without departing from the conception of the present application, all of which shall be considered to belong to the protection scope of the present application.

The invention claimed is:

1. A display panel, comprising:
a substrate including a plurality of pixel regions; and
an electrostatic discharge circuit disposed on the substrate;
wherein the electrostatic discharge circuit comprises a voltage gate high terminal (VGH terminal), a voltage gate low terminal (VGL terminal), an electrostatic input end and a common voltage terminal (VCOM terminal) coupled to components of the display panel; and
a first discharge unit comprising a first P-type thin film transistor (TFT) and a second P-type thin film transistor, wherein a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are connected to the source of the first P-type thin film transistor, and a source of the second P-type thin film transistor is connected to the VGL terminal; and
a second discharge unit, wherein an input end of the second discharge unit is connected to the electrostatic input end, an output end of the second discharge unit is connected to the VCOM terminal, the second discharge circuit comprises a third thin film transistor, a capacitor and a fourth thin film transistor, an input end and a control end of the third thin film transistor are connected to the electrostatic input end, an output end of the third thin film transistor is connected to the VCOM terminal, the VCOM terminal is connected to GND, a first end of the capacitor is connected to the electrostatic input end, a second end of the capacitor is connected to the control end of the third thin film transistor, an input end of a fourth thin film transistor is connected to the second end of the capacitor, a control end of the fourth thin film transistor is connected to the VGL terminal, an output end of the fourth thin film transistor is connected to the VGH terminal, the third thin film transistor and the fourth thin film transistor are P-type thin film transistors: a third P-type thin film transistor and a fourth P-type thin film transistor, a source of the third P-type thin film transistor is connected to a gate of the second P-type thin film transistor, a drain of the third P-type thin film transistor is connected to the VCOM terminal, the VCOM terminal is connected to GND, a first end of the capacitor is connected to the electrostatic input end, a second end of the capacitor is connected to a gate of the third P-type thin film transistor, a source of the fourth P-type thin film transistor is connected to the second end of the capacitor, a gate of the fourth P-type thin film transistor is connected to the VGL terminal, a drain of the fourth P-type thin film transistor is connected to the VGH terminal, the display panel comprises a gate integrated circuit, and the VGH terminal and the VGL terminal are respectively connected at a TFT voltage turn-on end and a TFT voltage turn-off end of the gate integrated circuit.

2. A display panel, comprising:
a substrate including a plurality of pixel regions; and
an electrostatic discharge circuit disposed on the substrate;
wherein the electrostatic discharge circuit comprises a voltage gate high terminal (VGH terminal), a voltage gate low terminal (VGL terminal), an electrostatic input end and a common voltage terminal (VCOM terminal) coupled to components of the display panel; and
a first discharge unit comprising a first P-type thin film transistor and a second P-type thin film transistor, wherein a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are also connected to the source of the first P-type thin film transistor, and a source of the second P-type thin film transistor is connected to the VGL terminal; and
a second discharge unit, wherein an input end of the second discharge unit is connected to the electrostatic input end, and an output end of the second discharge unit is connected to the VCOM terminal.

3. The display panel according to claim 2, wherein the second discharge unit comprises a first conducting line with one end connected to the common voltage terminal (VCOM terminal), and the VCOM terminal is connected to GND.

4. The display panel according to claim 2, wherein the second discharge unit comprises a first conducting line with one end connected to the common voltage terminal (VCOM terminal), and the VCOM terminal is connected to a VCOM terminal of the display panel.

5. The display panel according to claim 2, wherein the second discharge circuit comprises a third thin film transistor, an input end and a control end of the third thin film transistor are connected to the electrostatic input end, and an output end of the third thin film transistor is connected to the common voltage terminal (VCOM terminal).

6. The display panel according to claim 5, wherein the second discharge circuit comprises a capacitor, a first end of the capacitor is connected to the electrostatic input end, and a second end of the capacitor is connected to the control end of the third thin film transistor.

7. The display panel according to claim 6, wherein the second discharge circuit comprises a fourth thin film transistor, a control end of the fourth thin film transistor is connected to the voltage gate low terminal (VGL terminal), and an output end of the fourth thin film transistor is connected to the voltage gate high terminal (VGH terminal).

8. The display panel according to claim 2, wherein the second discharge circuit comprises a third thin film transistor, an input end and a control end of the third thin film transistor are connected to the electrostatic input end, an output end of the third thin film transistor is connected to the common voltage terminal (VCOM terminal), the second discharge circuit comprises a capacitor, a first end of the capacitor is connected to the electrostatic input end, and a second end of the capacitor is connected to the control end of the third thin film transistor.

9. The display panel according to claim 2, wherein the second discharge circuit comprises a third thin film transistor, an input end and a control end of the third thin film transistor are connected to the electrostatic input end, an output end of the third thin film transistor is connected to the common voltage terminal (VCOM terminal), the second discharge circuit comprises a capacitor, a first end of the capacitor is connected to the electrostatic input end, a second end of the capacitor is connected to the control end of the third thin film transistor, the second discharge circuit comprises a fourth thin film transistor, a control end of the fourth thin film transistor is connected to the voltage gate low terminal (VGL terminal), and an output end of the fourth thin film transistor is connected to the voltage gate high terminal (VGH terminal).

10. The display panel according to claim 2, wherein the second discharge unit comprises a first conducting line with one end connected to the common voltage terminal (VCOM terminal), the VCOM terminal is connected to GND, the second discharge circuit comprises a third thin film transistor, an input end and a control end of the third thin film transistor are connected to the electrostatic input end, an output end of the third thin film transistor is connected to the VCOM terminal, the second discharge circuit comprises a capacitor, a first end of the capacitor is connected to the electrostatic input end, a second end of the capacitor is connected to the control end of the third thin film transistor, the second discharge circuit comprises a fourth thin film transistor, a control end of the fourth thin film transistor is connected to the voltage gate low terminal (VGL terminal), and an output end of the fourth thin film transistor is connected to the voltage gate high terminal (VGH terminal).

11. The display panel according to claim 2, wherein the second discharge unit comprises a first conducting line with one end connected to the common voltage terminal (VCOM terminal), the VCOM terminal is connected to a VCOM terminal of the display panel, the second discharge circuit comprises a third thin film transistor, an input end and a control end of the third thin film transistor are connected to the electrostatic input end, an output end of the third thin film transistor is connected to the VCOM terminal, the second discharge circuit comprises a capacitor, a first end of the capacitor is connected to the electrostatic input end, a second end of the capacitor is connected to the control end of the third thin film transistor, the second discharge circuit comprises a fourth thin film transistor, a control end of the fourth thin film transistor is connected to the voltage gate low terminal (VGL terminal), and an output end of the fourth thin film transistor is connected to the voltage gate high terminal (VGH terminal).

12. The display panel according to claim 2, wherein the second discharge circuit comprises a third thin film transistor, a capacitor and a fourth thin film transistor, an input end and a control end of the third thin film transistor are connected to the electrostatic input end, an output end of the third thin film transistor is connected to the common voltage terminal (VCOM terminal), the VCOM terminal is connected to GND, a first end of the capacitor is connected to the electrostatic input end, a second end of the capacitor is connected to the control end of the third thin film transistor, an input end of a fourth thin film transistor is connected to the second end of the capacitor, a control end of the fourth thin film transistor is connected to the voltage gate low terminal (VGL terminal), and an output end of the fourth thin film transistor is connected to the voltage gate high terminal (VGH terminal).

13. The display panel according to claim 12, wherein the third thin film transistor and the fourth thin film transistor are P-type thin film transistors: a third P-type thin film transistor and a fourth P-type thin film transistor, a source of the third P-type thin film transistor is connected to a gate of the second P-type thin film transistor, a drain of the third P-type thin film transistor is connected to the common voltage terminal (VCOM terminal), the VCOM terminal is connected to GND, a first end of the capacitor is connected to the electrostatic input end, a second end of the capacitor is connected to a gate of the third P-type thin film transistor, a source of the fourth P-type thin film transistor is connected to the second end of the capacitor, a gate of the fourth P-type thin film transistor is connected to the voltage gate low terminal (VGL terminal), and a drain of the fourth P-type thin film transistor is connected to the voltage gate high terminal (VGH terminal).

14. The display panel according to claim 2, wherein the second discharge circuit comprises a third thin film transistor, a capacitor and a fourth thin film transistor, an input end and a control end of the third thin film transistor are connected to the electrostatic input end, an output end of the third thin film transistor is connected to the common voltage terminal (VCOM terminal), the VCOM terminal is connected to GND, a first end of the capacitor is connected to the electrostatic input end, a second end of the capacitor is connected to the control end of the third thin film transistor, an input end of a fourth thin film transistor is connected to the second end of the capacitor, a control end of the fourth thin film transistor is connected to the voltage gate low terminal (VGL terminal), an output end of the fourth thin film transistor is connected to the voltage gate high terminal (VGH terminal), the third thin film transistor and the fourth thin film transistor are P-type thin film transistors: a third P-type thin film transistor and a fourth P-type thin film transistor, a source of the third P-type thin film transistor is connected to a gate of the second P-type thin film transistor, a drain of the third P-type thin film transistor is connected to the VCOM terminal, the VCOM terminal is connected to GND, a first end of the capacitor is connected to the electrostatic input end, a second end of the capacitor is connected to a gate of the third P-type thin film transistor, a source of the fourth P-type thin film transistor is connected to the second end of the capacitor, a gate of the fourth P-type thin film transistor is connected to the VGL terminal, and a drain of the fourth P-type thin film transistor is connected to the VGH terminal.

15. The display panel according to claim 2, wherein the display panel comprises a gate integrated circuit, and the voltage gate high terminal (VGH terminal) and the voltage gate low terminal (VGL terminal) are respectively connected at a TFT voltage turn-on end and a TFT voltage turn-off end of the gate integrated circuit.

16. The display panel according to claim 2, wherein the second discharge unit comprises a first conducting line with one end connected to the common voltage terminal (VCOM terminal), the VCOM terminal is connected to GND, the second discharge circuit comprises a third thin film transistor, an input end and a control end of the third thin film transistor are connected to the electrostatic input end, an output end of the third thin film transistor is connected to the VCOM terminal, the second discharge circuit comprises a capacitor, a first end of the capacitor is connected to the electrostatic input end, a second end of the capacitor is connected to the control end of the third thin film transistor, the second discharge circuit comprises a fourth thin film transistor, a control end of the fourth thin film transistor is connected to the voltage gate low terminal (VGL terminal), an output end of the fourth thin film transistor is connected to the voltage gate high terminal (VGH terminal), the display panel comprises a gate integrated circuit, and the VGH terminal and the VGL terminal are respectively connected at a TFT voltage turn-on end and a TFT voltage turn-off end of the gate integrated circuit.

17. The display panel according to claim 2, wherein the second discharge unit comprises a first conducting line with one end connected to the common voltage terminal (VCOM terminal), the VCOM terminal is connected to a VCOM terminal of the display panel, the second discharge circuit comprises a third thin film transistor, an input end and a control end of the third thin film transistor are connected to the electrostatic input end, an output end of the third thin film transistor is connected to the VCOM terminal, the second discharge circuit comprises a capacitor, a first end of the capacitor is connected to the electrostatic input end, a second end of the capacitor is connected to the control end of the third thin film transistor, the second discharge circuit comprises a fourth thin film transistor, a control end of the fourth thin film transistor is connected to the voltage gate low terminal (VGL terminal), an output end of the fourth thin film transistor is connected to the VGH terminal, the display panel comprises a gate integrated circuit, and the voltage gate high terminal (VGH terminal) l and the VGL terminal are respectively connected at a TFT voltage turn-on end and a TFT voltage turn-off end of the gate integrated circuit.

18. The display panel according to claim 2, wherein the second discharge circuit comprises a third thin film transistor, a capacitor and a fourth thin film transistor, an input end and a control end of the third thin film transistor are connected to the electrostatic input end, an output end of the third thin film transistor is connected to the common voltage terminal (VCOM terminal), the VCOM terminal is connected to GND, a first end of the capacitor is connected to the electrostatic input end, a second end of the capacitor is connected to the control end of the third thin film transistor, an input end of a fourth thin film transistor is connected to the second end of the capacitor, a control end of the fourth thin film transistor is connected to the voltage gate low terminal (VGL terminal), an output end of the fourth thin film transistor is connected to the voltage gate high terminal (VGH terminal), the third thin film transistor and the fourth thin film transistor are P-type thin film transistors: a third P-type thin film transistor and a fourth P-type thin film transistor, a source of the third P-type thin film transistor is connected to a gate of the second P-type thin film transistor, a drain of the third P-type thin film transistor is connected to the VCOM terminal, the VCOM terminal is connected to GND, a first end of the capacitor is connected to the electrostatic input end, a second end of the capacitor is connected to a gate of the third P-type thin film transistor, a source of the fourth P-type thin film transistor is connected to the second end of the capacitor, a gate of the fourth P-type thin film transistor is connected to the VGL terminal, a drain of the fourth P-type thin film transistor is connected to the VGH terminal, the display panel comprises a gate integrated circuit, and the VGH terminal and the VGL terminal are respectively connected at a TFT voltage turn-on end and a TFT voltage turn-off end of the gate integrated circuit.

19. A display apparatus, comprising a backlight module and a display panel, wherein the display panel comprises:
a substrate including a plurality of pixel regions;
an electrostatic discharge circuit disposed on the substrate;
wherein the electrostatic discharge circuit comprises a voltage gate high terminal (VGH terminal), a voltage gate low terminal (VGL terminal), an electrostatic input end and a common voltage terminal (VCOM terminal) coupled to components of the display panel; and
a first discharge unit comprising a first P-type thin film transistor and a second P-type thin film transistor, wherein a gate of the first P-type thin film transistor is connected to a drain of the first P-type thin film transistor, and a gate and a drain of the first P-type thin film transistor are also connected to the VGH terminal, a source of the first P-type thin film transistor is connected to the electrostatic input end, a gate of the second P-type thin film transistor is connected to a drain of the second P-type thin film transistor, and a gate and a drain of the second P-type thin film transistor are also connected to the source of the first P-type thin film transistor, and a source of the second P-type thin film transistor is connected to the VGL terminal; and
a second discharge unit, wherein an input end of the second discharge unit is connected to the electrostatic input end, an output end of the second discharge unit is connected to the VCOM terminal, the second discharge circuit comprises a third thin film transistor, a capacitor and a fourth thin film transistor, an input end and a control end of the third thin film transistor are connected to the electrostatic input end, an output end of the third thin film transistor is connected to the VCOM terminal, the VCOM terminal is connected to GND, a first end of the capacitor is connected to the electrostatic input end, a second end of the capacitor is connected to the control end of the third thin film transistor, an input end of a fourth thin film transistor is connected to the second end of the capacitor, a control end of the fourth thin film transistor is connected to the VGL terminal, an output end of the fourth thin film transistor is connected to the VGH terminal, the third thin film transistor and the fourth thin film transistor are P-type thin film transistors: a third P-type thin film transistor and a fourth P-type thin film transistor, a source of the third P-type thin film transistor is connected to a gate of the second P-type thin film transistor, a drain of the third P-type thin film transistor is connected to the VCOM terminal, the VCOM terminal is connected to GND, a first end of the capacitor is connected to the electrostatic input end, a second end of the capacitor is connected to a gate of the third P-type thin film transistor, a source of the fourth P-type thin film transistor is connected to the second end of the capacitor, a gate of the fourth P-type thin film transistor is connected to the VGL terminal, a drain of the fourth P-type thin film transistor is connected to the VGH terminal, the display panel comprises a gate integrated circuit, and the VGH terminal and the VGL terminal are respectively connected at a TFT voltage turn-on end and a TFT voltage turn-off end of the gate integrated circuit.

* * * * *